UNITED STATES PATENT OFFICE.

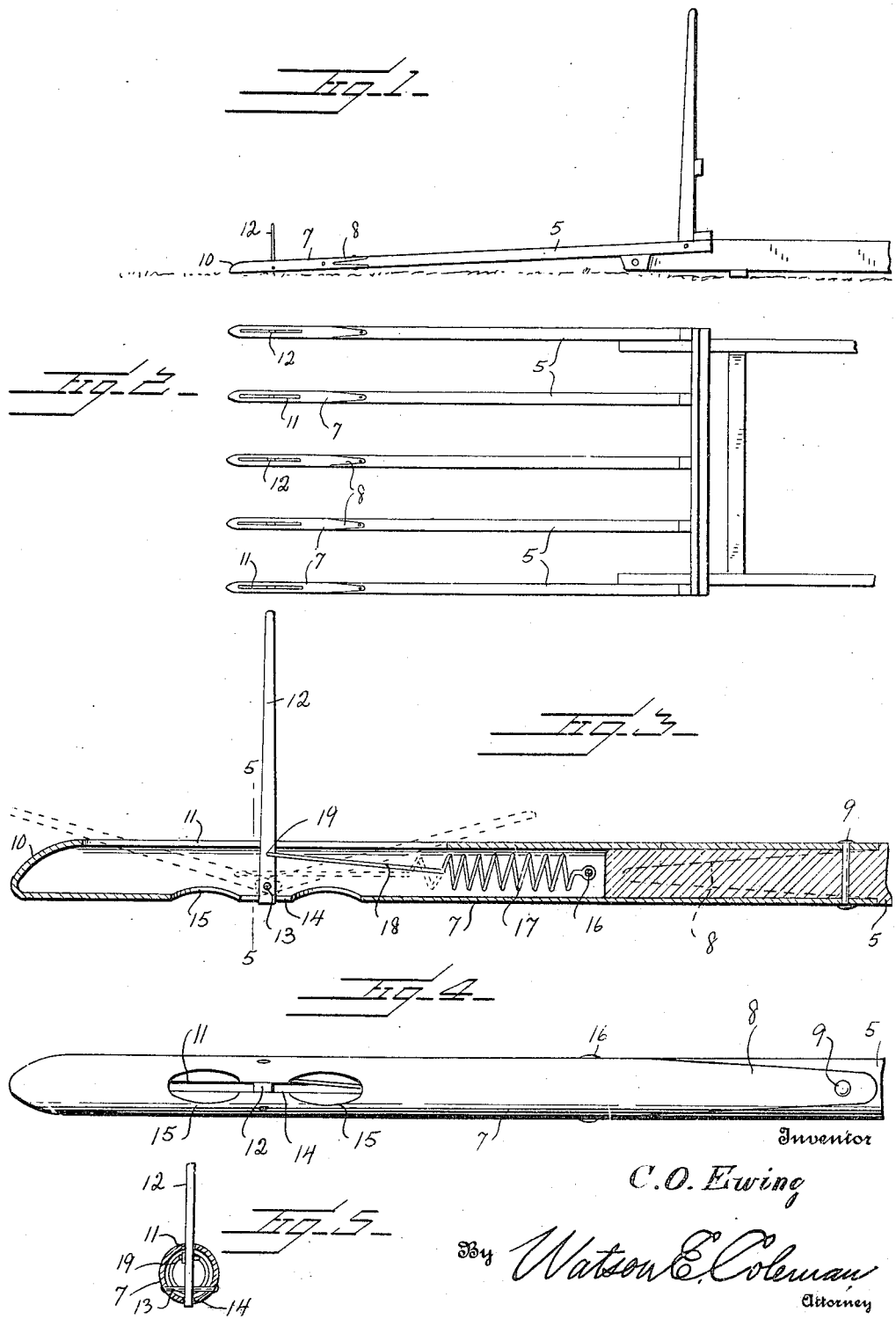

CLYDE O. EWING, OF RICHFIELD, IDAHO.

RETAINER FOR HAY-STACKERS.

1,322,773.  Specification of Letters Patent.  Patented Nov. 25, 1919.

Application filed December 24, 1918. Serial No. 268,204.

*To all whom it may concern:*

Be it known that I, CLYDE O. EWING, a citizen of the United States, residing at Richfield, in the county of Lincoln and State of Idaho, have invented certain new and useful Improvements in Retainers for Hay-Stackers, of which the following is a specification, reference being had to the accompanying drawings.

This invention relates to retainers for hay stackers, and has for its primary object to provide very simple and effective means for retaining the hay upon the stacker bars when the sweeper rake is withdrawn after the delivery of its load to the stacker.

It is also another and more particular object of my invention to provide a retaining finger pivotally mounted upon each of the stacker bars, and means effective to normally hold the finger in a position at right angles to the stacker bar but permitting of a pivotal movement of the finger in each direction as the sweeper rake is moved upon the stacker bars and then subsequently withdrawn therefrom.

It is also an important object of the invention to provide an improved mounting and arrangement of the holding means for the retaining finger so that it will not constitute an obstruction to the free movement of the sweeper rake or be in any way broken or damaged in the movement of the rake.

It is also a further general object of my invention to provide a device for the above purpose which may be manufactured and sold at relatively small cost and is applicable to the ordinary hay stacker now in common use without necessitating structural changes of a material character therein.

With the above and other objects in view, the invention consists in the improved construction, combination and relative arrangement of the several parts, as will be hereinafter more fully described, subsequently claimed and illustrated in the accompanying drawing in which similar reference characters designate corresponding parts throughout the several views, and wherein:—

Figure 1 is a side elevation of a part of a hay stacker illustrating my improved retaining means in its preferred embodiment as operatively applied thereto;

Fig. 2 is a plan view;

Fig. 3 is an enlarged longitudinal section taken on the line 3—3 of Fig. 2 and showing several positions of the retaining finger in dotted lines;

Fig. 4 is a bottom plan view; and

Fig. 5 is a section taken on the line 5—5 of Fig. 3.

Referring in detail to the drawing, 5 designates the hay receiving bars of a stacker, of which any desired number may be employed.

As one practical embodiment of my invention, I have herein illustrated a tubular extension 7 for each of the stacker bars 5. This extension at one of its ends is bifurcated, as at 8, to receive the end of the stacker bar, and a bolt or rivet 9 is adapted for engagement through coinciding openings in the spaced arms of the extension 7 and the end of the bar 5 whereby the parts may be rigidly secured together. The tubular extension 7 at its outer end is tapered and the upper surface thereof is rounded or convex, as shown at 10, so that the teeth of the sweeper rake will freely ride over the ends of the bar extensions 7.

Adjacent to the outer end of the extension 7, a longitudinally extending slot 11 is formed in the top portion thereof, and through this slot a retaining finger 12 extends. This finger may be of any desired length and is pivotally mounted at one end upon a transversely disposed bolt 13 extending through the tubular member 7 adjacent the base portion thereof. This pivoted end of the finger operates in a slot 14 in the base wall of the extension 7, and additional openings 15 are formed in said base wall at each side of the slot 14 so that straw, trash, and other material which may enter the tubular extension 7 through the slot 11 therein can readily find an outlet. A transversely disposed bolt 16 is fixed in the extension 7 adjacent to the inner end thereof, and to said bolt one end of a coil spring 17, which is housed within the tubular extension, is attached. This spring at its other end is provided with a relatively rigid, longitudinally extending rod or arm 18, the extremity of which is angularly bent and pivotally connected to the finger 12, as shown at 19, at a point in spaced relation to the pivot bolt 13.

In the practical operation of the device, it will be understood that normally the fingers 12 are held in vertical positions with respect to the tubular member 7 by means of the springs 17. When the teeth of the sweeper rake move over the extension 7 to deliver the load upon the stacker bars 5, they will strike the fingers 12 which will be forced inwardly and downwardly, whereby the springs 17 are compressed. When the rake is withdrawn from the stacker bars 5, the rake teeth will pull the fingers 12 in the opposite direction and thereby expand the springs 17. When the fingers 12 are released from the pressure of the rake teeth, they will be immediately returned to their vertical positions by the contractile action of the springs 17 and will catch and retain the small portion of hay which is invariably dragged off of the stacker bars with the sweeper rake. Thus, the whole of the load which was gathered by the sweeper will be retained on the stacker and subsequently delivered in the operation of the stacker upon the top of the hay stack. It is to be noted that the double acting springs 17 which permit of the yielding pivotal movement of the fingers in both directions, are completely housed within the tubular extensions 7 of the stacker bars so that they will not be liable to injury and breakage by the engagement of the rake teeth therewith. The extensions 7 are preferably of cylindrical form and are made from sections of piping. It is apparent that, if desired, these extensions of the stacker bars might be of rectangular or other cross sectional form.

From the foregoing description, taken in connection with the accompanying drawing, the construction, manner of operation and several advantages of my invention will be clearly and fully understood. The several parts of the device as herein disclosed are simple and durable in their construction and can be manufactured and assembled at relatively small cost. It is also to be noted that the present invention is capable of application to the ordinary hay stacker now in common use without necessitating material alterations in the construction thereof. The extensions 7 for the stacker bars may be of any desired length and the retaining fingers 12 may be mounted in said extensions or at any preferred distance from the front end of the extension. Of course, the fingers 12 may likewise be made in various lengths. It is, therefore, to be understood, in view of the many modifications of which my invention is obviously susceptible, that I do not desire to be restricted to the precise form, construction and relative arrangement of the various parts as herein disclosed, but reserve the privilege of adopting all such legitimate changes as may be fairly embodied within the spirit and scope of the invention as claimed.

I claim:—

1. The combination with a stacker bar, of a tubular extension fixed to the end of said bar and having a longitudinal slot in the top wall thereof, a retaining finger pivotally mounted at one of its ends within said tubular extension projecting through said slot, and a coil spring housed within the extension and operatively connected to said finger at a point in spaced relation to its pivot to yieldingly hold said finger normally in a vertical position but permit of its pivotal movement in each direction.

2. A retaining device for hay stackers including a tubular member having a longitudinal slot in its top wall, a retaining finger pivotally mounted within said tubular member and extending through said slot, and a longitudinally extending coil spring housed within the tubular member and fixed at one of its ends thereto, the other end of said spring being operatively connected to the finger at a point in spaced relation to its pivot, said spring acting to normally hold the finger in a vertical position but permitting of its pivotal movement in each direction.

3. A retaining device for hay stackers including a tubular member bifurcated at one end to receive the stacker bar and having a longitudinally extending slot in its top wall, a retaining finger pivotally mounted within said tubular member and extending through said slot, and a coil spring housed within said member and fixed at one of its ends thereto, said member at its other end being provided with a longitudinally extending rod pivotally connected to the finger at a point in spaced relation to the pivot thereof, said spring normally acting to hold the finger in a vertical position but permitting of its pivotal movement in each direction.

In testimony whereof I hereunto affix my signature.

CLYDE O. EWING.